US006678104B2

(12) United States Patent
Morling et al.

(10) Patent No.: US 6,678,104 B2
(45) Date of Patent: Jan. 13, 2004

(54) EQUALIZATION PRE-AMBLE REGION IN DIGITAL DATA STORAGE (DDS) FORMAT

(75) Inventors: Robert Philip Morling, Malahide (IR); Andrew Hana, Bradley Stoke (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 139 days.

(21) Appl. No.: 09/826,810

(22) Filed: Apr. 6, 2001

(65) Prior Publication Data

US 2001/0028521 A1 Oct. 11, 2001

(30) Foreign Application Priority Data

Apr. 10, 2000 (EP) .............................. 00303019

(51) Int. Cl.$^7$ .............................. G11B 20/14
(52) U.S. Cl. .............................. 360/40; 360/48; 360/46
(58) Field of Search .............................. 360/48, 65, 39, 360/40, 51, 46; 375/367

(56) References Cited

U.S. PATENT DOCUMENTS

| 3,789,377 A | * | 1/1974 | Norris | 375/267 |
| 5,349,611 A | * | 9/1994 | Varian | 375/267 |
| 5,841,601 A | | 11/1998 | Fisher | |

FOREIGN PATENT DOCUMENTS

| EP | A-831 480 | 3/1998 |
| JP | 2-177 062 | 7/1990 |

* cited by examiner

*Primary Examiner*—Alan T. Faber (57) ABSTRACT

A method of encoding a digital data stream for writing to a digital storage (DDS) format tape data storage medium comprises writing a byte stream to a preamble region, immediately preceding a user data region. The byte stream has a power spectrum substantially similar to a power spectrum of the user data region. An automatic gain control circuit responds to the preamble data stream in a substantially similar fashion to its response to the user data stream.

30 Claims, 11 Drawing Sheets

EQUALIZATION PRE-AMBLE REGION IN DIGITAL DATA STORAGE (DDS) FORMAT

FIELD OF THE INVENTION

The present invention relates to the field of data storage devices, and particularly, although not exclusively, to the field of digital data storage systems having a tape data storage medium which moves relative to a read/write head.

BACKGROUND TO THE INVENTION

It is known to provide reliable storage and retrieval of digital data, particularly computer data, by means of a digital data storage (DDS) format defined in ISO/IEC standard 10777:1991E. DDS format devices have developed through versions DDS-1 to DDS-4, which are known in the prior art.

In a DDS device, an elongate band of magnetic tape contained upon a pair of spools in a data storage cassette is transported past one or more electromagnetic read and write heads, such that the rotating magnetic heads trace a path which is substantially diagonal across a main length of the elongate magnetic tape. Multiple passes of the write heads result in multiple diagonal tracks across the magnetic tape, which extend along a length of the magnetic tape.

Figure 1:
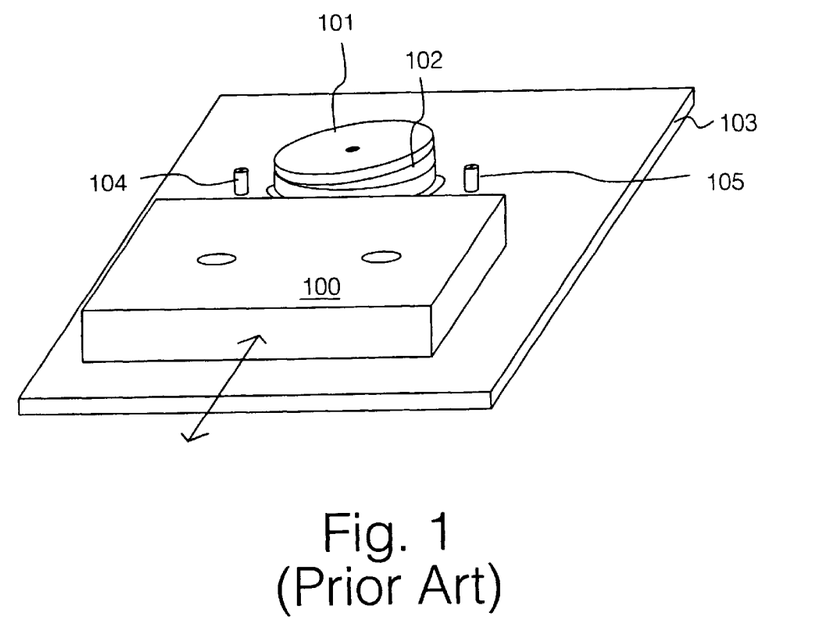
FIG. 1 illustrates a physical mechanism of a prior art DDS data storage device comprising a magnetic tape data storage medium contained within a removable cassette, read by a rotating read/write head.

Referring to FIG. 1 herein, there is shown schematically a layout of a tape data storage cartridge in relation to a tape drive mechanism according to the DDS format, in which an elongate band of tape is contained within a removable tape cartridge 100. The tape cartridge is inserted into the tape drive mechanism. A rotating read/write head 101 comprises first and second read heads and first and second write heads situated at substantially equidistant points around a circumference of the rotating head. The head rotates on top of a substantially cylindrical metallic plinth 102. The read/write head rotates at a speed of approximately 11,400 revs per minute. A main central axis of a cylinder formed by the outer surfaces of the drum and the plinth is directed offset from a line normal to a plane of a base plate 103, so that the effect is that as the band of tape traverses around part of the circumference of the cylindrical head plinth, the rotating heads describe a path diagonally across the width of the tape in successive passes of the heads past the tape.

Figure 2:
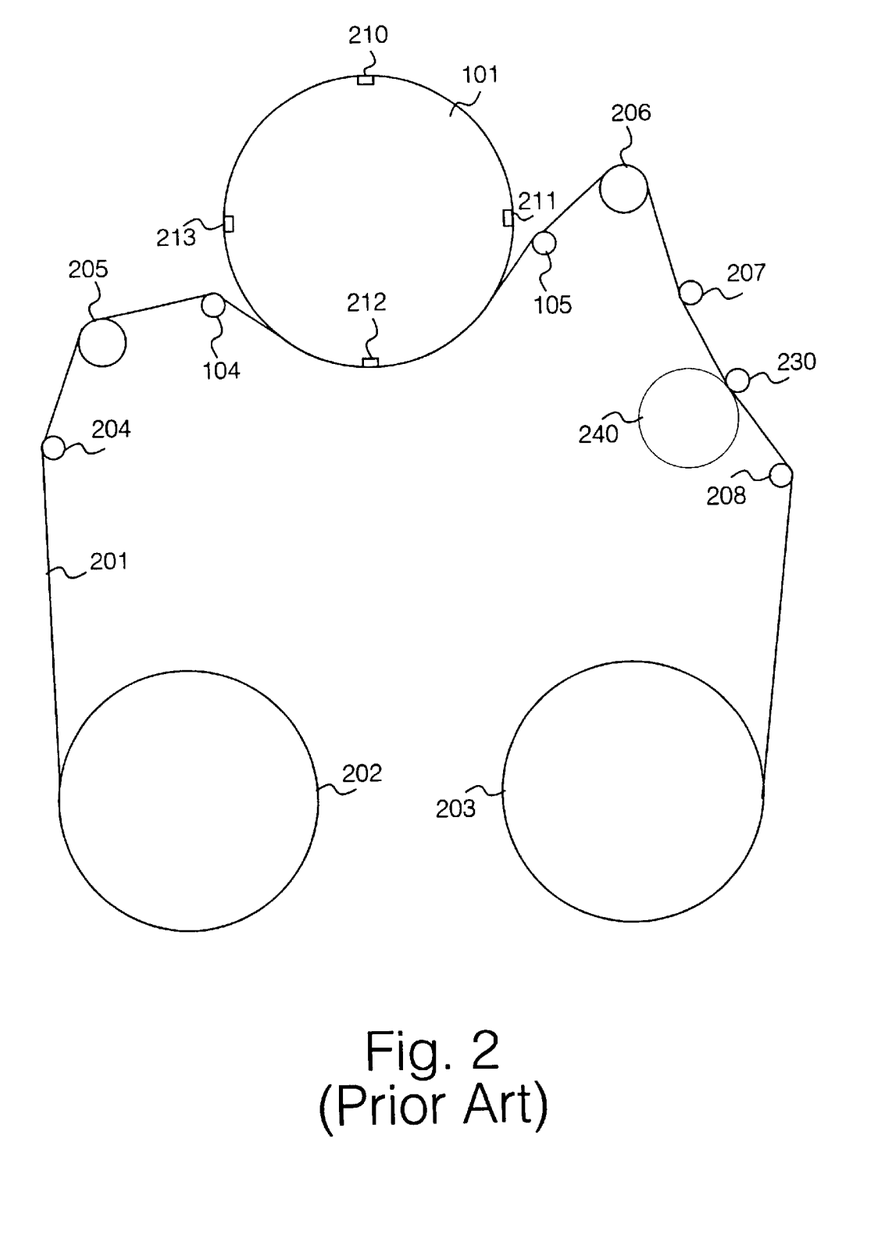
FIG. 2 illustrates schematically the path of a magnetic tape data storage medium with respect to a rotating drum containing a plurality of read heads and a plurality of write heads according to the prior art DDS format.

Referring to FIG. 2 herein there is shown schematically a tape path of the elongate magnetic tape data storage medium 201 as it is drawn past the rotating drum containing the read and write heads. The tape data storage medium 201 is wound onto a feed reel 202 and a take up reel 203 which are within the removable tape cartridge 100. During normal operation, the magnetic tape 201 is wound from the feed-reel 202 on to the take-up reel 203. The path of the magnetic tape 201 is constrained by a plurality of rollers and tape guides 204–208. Additional tape guides 104, 105 determine the relative positions of the rotating drum 102, the read and write heads 210–213 and the tape data storage medium 201. The feed reel 202 and take up reel 203 are driven by electric motors to maintain a correct tension in the magnetic tape 201 past the head.

Figure 3:
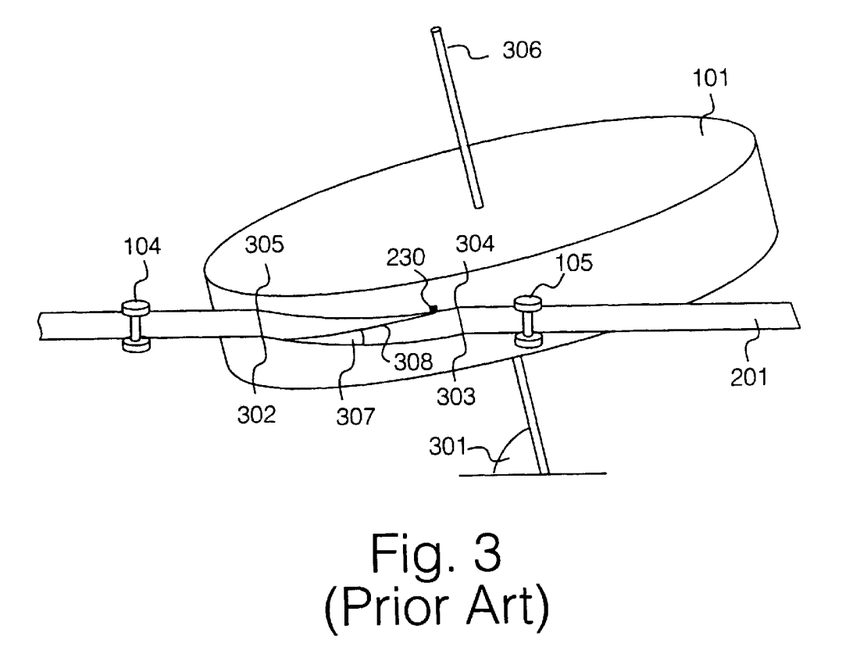
FIG. 3 illustrates schematically rotation of the drum containing a plurality of read/write heads with respect to an elongate band of magnetic tape drawn in an arcuate path around the rotating drum.

Referring to FIG. 3 herein, there is illustrated schematically the orientation of the magnetic tape 201 with respect to the rotating drum 101. The tape 201 is drawn past the rotating head at a relatively slow tape speed of the order of a few centimeters per second. However, the rotating drum 101 on which the read and write heads are mounted, typically rotates at a few thousand revolutions per minute, so the relative speed of the read and write heads to the drum is of magnitudes of order greater than the absolute tape speed.

During a write operation, the write heads record a sequence of tracks diagonally across the elongate magnetic tape 201. The width of such tracks is typically of the order of 6.8 $\mu$m.

Figure 4:
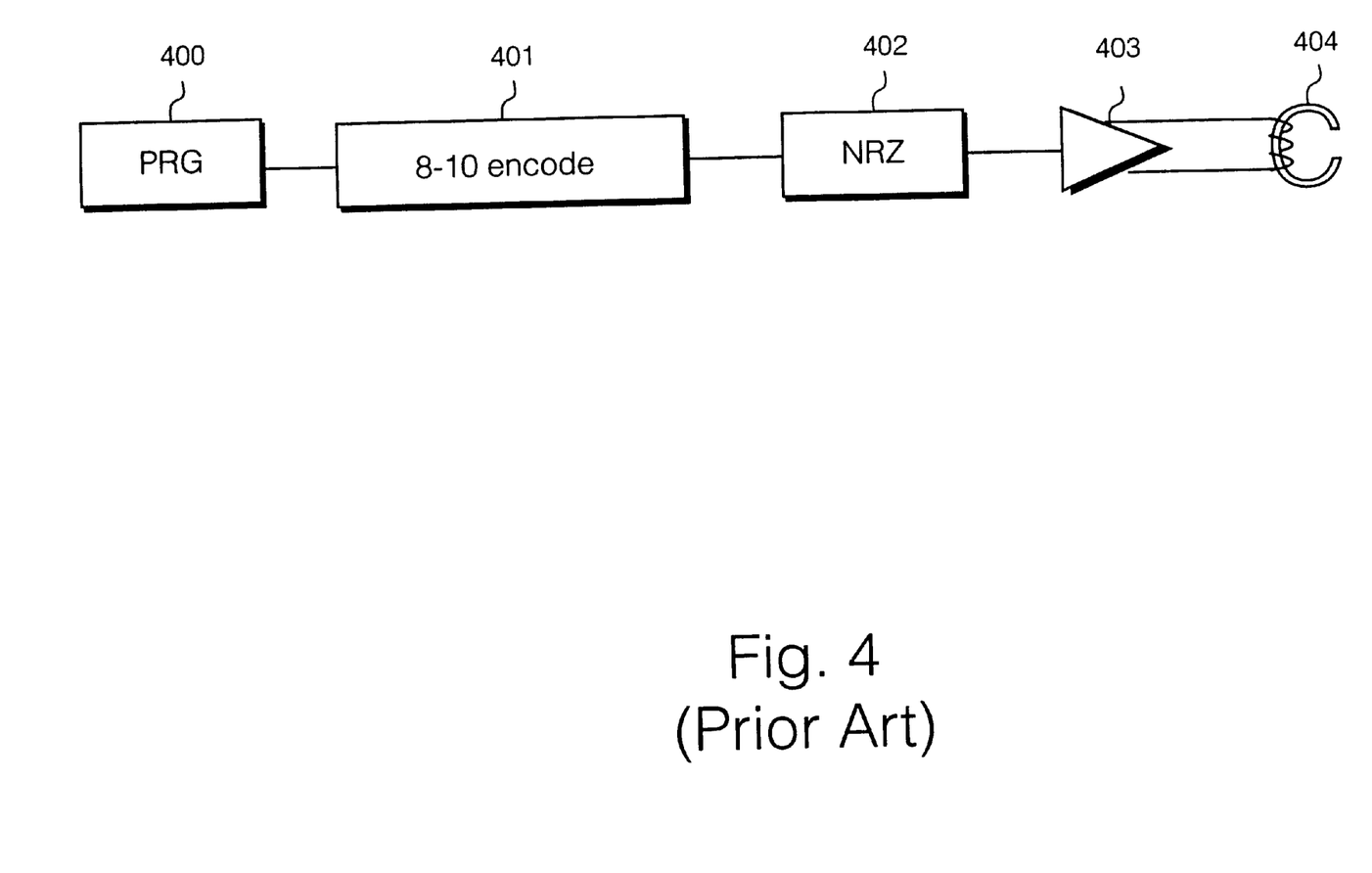
FIG. 4 illustrates schematically a write signal channel for writing data to a magnetic tape according to the known DDS format.

Referring to FIG. 4 herein, there is illustrated schematically a portion of a write circuit for writing a logical track according to the specific implementation of the present invention. The write circuit contains a linear feedback shift register 400 for generating a pseudo random bit sequence as described herein for incorporation into a preamble field of the logical data track; an 8-10 encoder 401; a non-return to zero circuit 402, an output amplifier 403, and a write head 404.

Figure 5:
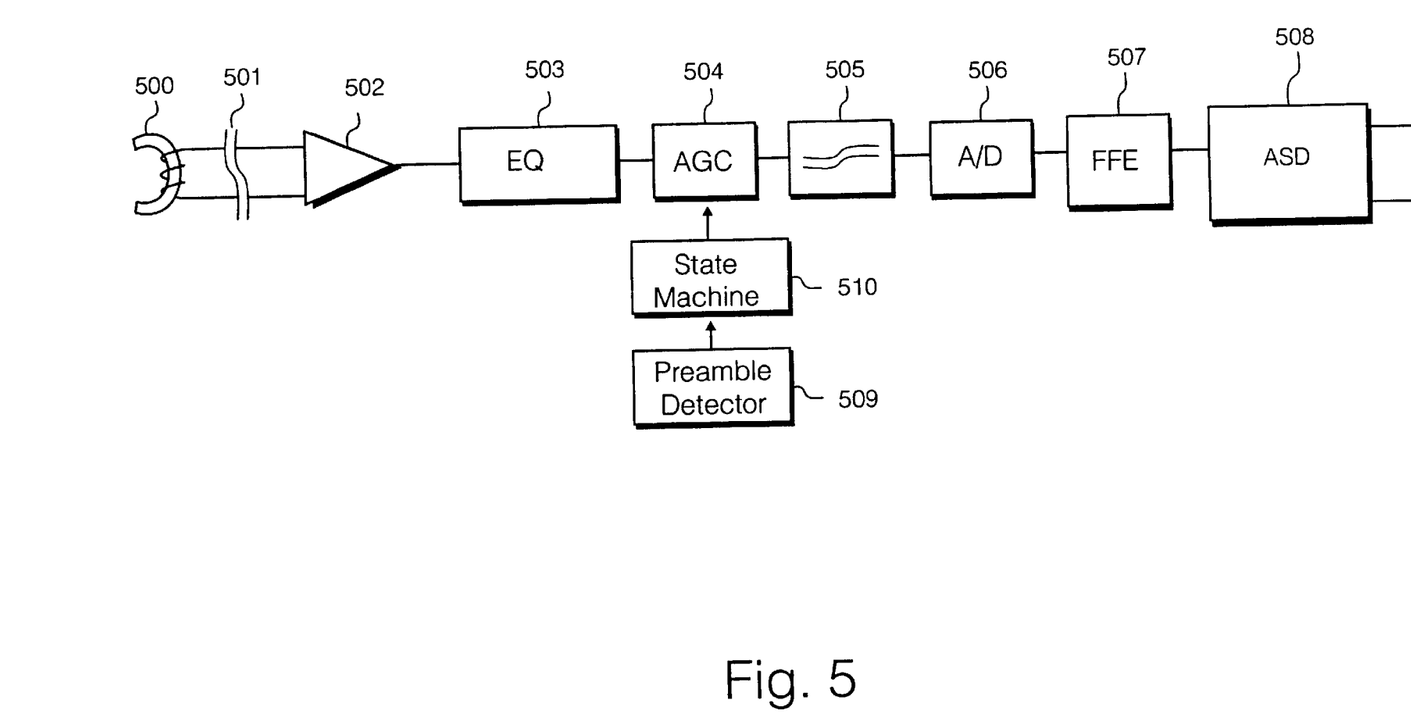
FIG. 5 illustrates schematically a read channel for reading data from a magnetic tape according to the known DDS format.

Referring to FIG. 5 herein, there is shown schematically a read channel for reading data from a data storage medium of cartridge 100. The read channel comprises a read head 500. Data stored on the tape is read by the read head 500 which passes the signal via a rotary transformer 501 to an amplifier 502. Amplifier 502 sends an amplified output signal which is input into an equalizer 503 for the purpose of initial equalization. After equalization, the signal is passed into an automatic gain control circuit 504, and is filtered in a filter 505 which further shapes an overall channel frequency response to match a required equalization characteristic. The filtered signal is supplied to an analog to digital converter 506 which produces a digitized version of the filtered signal, which is then passed to a feed forward equalizer 507 which further equalizes the signal to a required equalization target. An equalized digital signal output from the feed forward equalizer 507 is input into a sequence detector 508. The sequence detector 508 includes a Viterbi engine, and various detection paths for determining a sequence of bits resulting from the signal read by the read head 500. The read channel also includes a preamble detector 509 for detecting preamble data before reading user data, the preamble detector producing an output which is set into a state machine 510, The output of the state machine controls automatic gain control circuit 504 to adjust a gain in the read channel.

Figure 6:
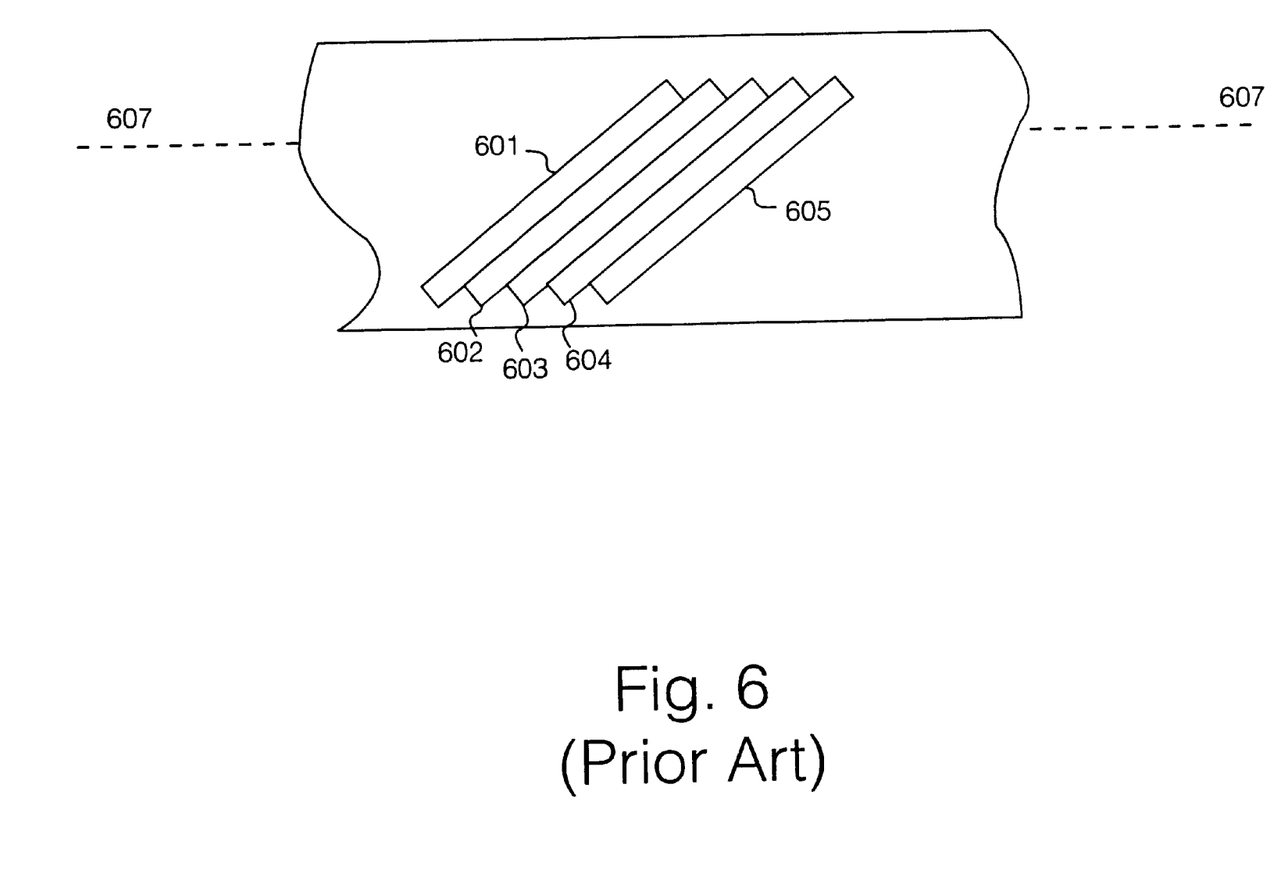
FIG. 6 illustrates schematically physical layout of data tracks written on an elongate magnetic band data storage medium according to the known DDS format.

Referring to FIG. 6 herein, there is illustrated schematically a layout of physical tracks striped across a width of an elongate magnetic band tape in a cartridge. A plurality of tracks are written slightly overlaying each other by successive passes of the write head of a rotating drum.

Figure 7:
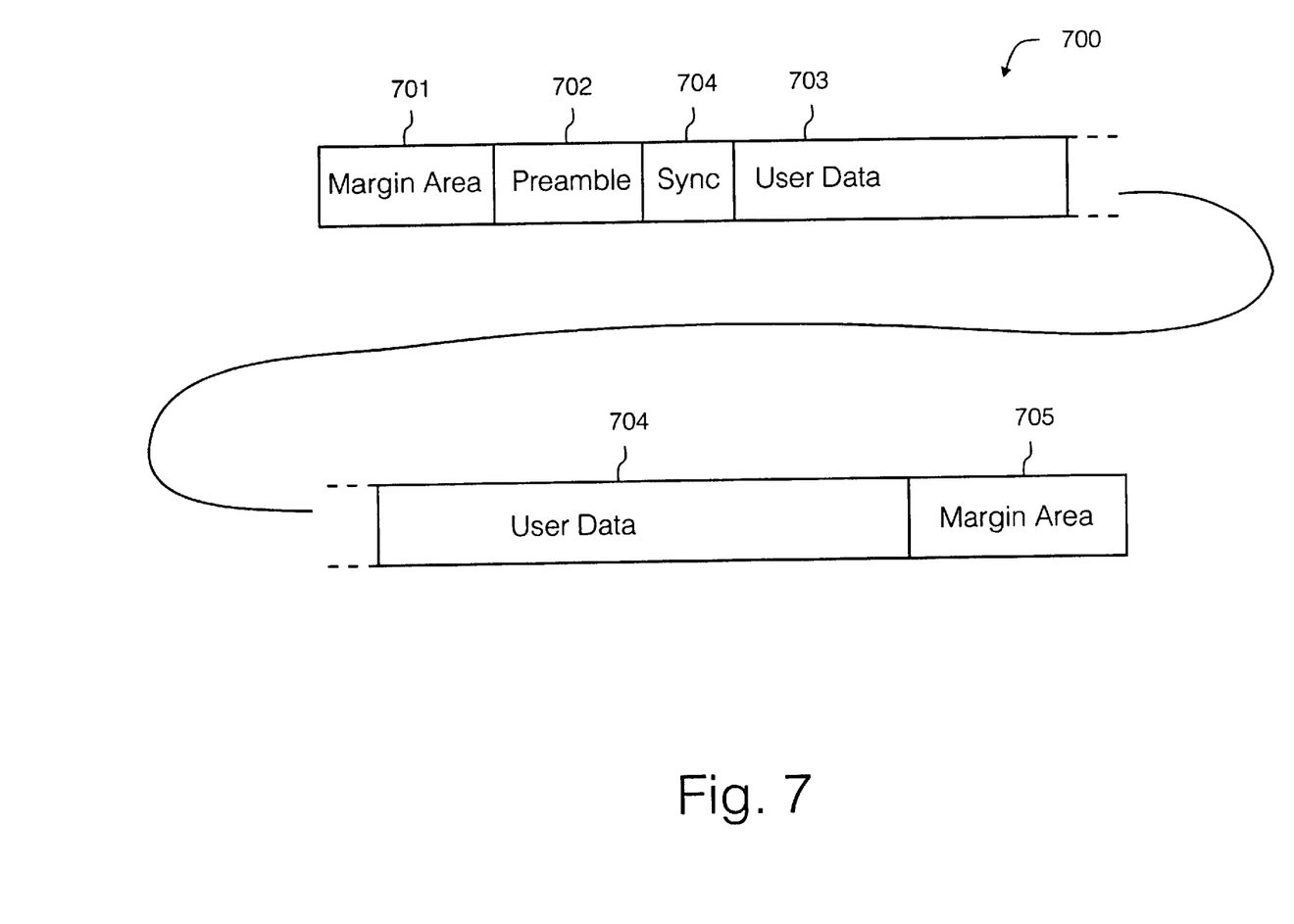
FIG. 7 illustrates schematically a logical layout of data written along one diagonally written physical track across the elongate magnetic band in accordance with the known DDS format.

Referring to FIG. 7 herein, there is illustrated schematically a logical data layout of a single track written across the tape data storage medium in a single pass of a write head across the width of the tape. The logical track 700 comprises at a start of the logical track, a first margin area 701 which when written physically resides at one edge of the tape data storage medium; a preamble region 702; a user data region 703, preceded by a synchronization header 704; and a second margin area 705 written after the user data 703, the second margin area laying physically at a second edge of the tape data storage medium. The preamble region is positioned between the first margin area 701 and the user data 703 and immediately preceding the user data 703. The purpose of the preamble region is acquire gain and timing information prior to reading the user data 703 with the object of achieving an optimum bit error rate in reading the user data area 703.

The prior art preamble field contains a 2T tone data. However, as the density of bits stored on tape increases, the 2T tone data preamble field gives rise to a problem of fluctuation of gain control in the automatic gain control circuit 504 which becomes unacceptable for reading higher bit densities.

In the prior art DDS-4 format, the preamble region 702 usually consists of a single frequency constant tone bit sequence which immediately precedes the user data 703. The DDS-4 logical format calls for a constant 2T tone in the preamble region. The parameter T relates to the minimum acceptable spacing between pulse transitions. In the DDS-4 format the preamble region 702 consists of 640 bits of data. The bits of data are arranged in transitions of 2T length, that is to say 4 bits per cycle. This gives a preamble region length of 160 cycles (640T), each cycle being +,+,−,−. The physical distance occupied by a cycle on the tape data storage medium depends upon the data storage density of bits on the tape. The overall physical length of preamble field as recorded onto tape in the DDS-4 format is approximately 107 μm.

SUMMARY OF THE INVENTION

According to one aspect of the present invention there is provided a method of encoding a plurality of tracks of data for storage on a tape data storage medium, said method characterized by comprising for each of said plurality of data tracks written to said tape data storage medium, writing within said data track, a preamble region (702) which precedes a user data region, said preamble region having a preamble data sequence having a power spectrum (900) substantially similar to a power spectrum of a substantially random data.

Preferably said preamble data sequence has a power spectrum having no significant troughs over a frequency band extending between first and second −6 dB power levels, each side of a peak value.

Preferably said preamble region (702) comprises between 800 and 900 bits per physical data track in a best mode implementation.

Preferably said preamble data sequence has a power spectrum characteristic prior to any subsequent encoding which may occur, substantially similar to a power spectrum characteristic of the following byte stream of hexidecimal coded numbers b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57.

Said preamble data may comprise bits, which when written to tape each occupy a length of the order of 100 to 140 nanometers per bit. Preferably, the bits have a wavelength of approximately 125 nanometers.

The preamble data sequence preferably has a uniform distribution of transitions having valid phase information, from which a timing circuit can recover timing data. The preamble data sequence may have a distribution of density of transitions having valid phase information which is free of peaks of transitions of more than + or −6 in density.

In a preferred format, said plurality of data tracks are written across a width of said tape data storage medium in a direction transverse to a main length of said tape data storage medium.

Preferably said preamble data sequence is coded prior to writing to tape, and said coded preamble sequence has a power spectrum substantially similar to a power spectrum of an 8-10 modulation coding convolved with a power spectrum of a substantially random data.

Preferably, the preamble data sequence has at least 8 bits corresponding to a 2T transition pattern, where a 1T transition comprises a minimum spacing between pulse transitions.

The invention includes a plurality of tracks of data for storage on a tape data storage medium, said method characterized by comprising for each of said plurality of data tracks written to a tape data storage medium, writing within said data track a preamble region having a preamble data sequence having a power spectrum substantially similar to a power spectrum of a 8-10 modulation coding convolved with a power spectrum of a substantially random data.

According to a second aspect of the present invention there is provided a method of encoding a plurality of tracks of data for storage on a tape data storage medium, said method characterized by comprising for each of said plurality of data tracks written to a tape data storage medium, writing within said data track a preamble region (702) having a preamble data sequence having a power spectrum (900) substantially similar to a power spectrum of a 8-10 modulation coding convolved with a power spectrum of a substantially random data.

According to a third aspect of the present invention there is provided a method of reading a data stream from a tape data storage medium, said method comprising the steps of reading a preamble data, said preamble data comprising a data stream having a power spectrum equivalent to a power spectrum of a substantially random bit stream; and synchronising to said read preamble data stream.

Preferably, the data stream comprises a byte stream having a power spectrum equivalent to a power spectrum of an 8-10 coding convolved with a power spectrum of a substantially random data.

The invention includes an encoder device for encoding a plurality of tracks of data for storage on a tape data storage medium, said encoder device comprising means for generating a byte stream as in any of the above aspects.

According to a fourth aspect of the present invention there is provided an apparatus for encoding a plurality of tracks of data for storage on a tape data storage medium, said apparatus comprising:

a write circuit for writing said plurality of data tracks to a tape data storage medium, said write circuit arranged for writing on said data track, a preamble region (702) which precedes a user data region, said preamble region having a preamble data sequence having a power spectrum substantially similar to a power spectrum of a substantially random data.

Preferably said write channel is arranged to write between 800 and 900 bits of said preamble data sequence on each of said plurality of tracks.

The apparatus may write a preamble data sequence having a power spectrum characteristic substantially similar to a power spectrum characteristic of the following byte stream of hexidecimal coded numbers;

b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57.

Each said bit may occupy a length of the order 100 to 140 nanometers per bit.

A distribution of transitions containing phase information validly useable by a timer circuit is preferably free of peaks of density of transitions of more than + or −6 from a mean value.

Preferably said plurality of data tracks are written across a width of said tape data storage medium in a direction transverse to a main length of said tape data storage medium.

Preferably the apparatus comprises an 8-10 encoder for encoding said preamble data sequence, to result in a 8-10 encoded preamble data sequence having a power spectrum substantially similar to a power spectrum of an 8-10 coding convolved with a power spectrum of a substantially random data.

The invention includes an apparatus for reading a data stream from a tape data storage medium, said apparatus comprising:

means for reading a preamble data sequence, said preamble data sequence comprising a data stream having a power spectrum equivalent to a power spectrum of a user data.

According to a fifth aspect of the present invention, there is provided an apparatus for reading and writing a data sequence, said data sequence comprising:

a preamble data region and;

a user data region;

wherein said preamble data region comprises a byte stream having a power spectrum substantially similar to a power spectrum of said user data in said user data region.

Preferably said byte stream comprises a byte stream having a power spectrum characteristic substantially similar to a power spectrum characteristic of the following byte stream of hexidecimal numbers:

b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57.

Suitably, the apparatus further comprises an 8-10 modulation coder for coding said preamble data and said user data, wherein said coded preamble data has a power spectrum substantially similar to a power spectrum of said user data convolved with a power spectrum of said modulation coding.

Suitably, the apparatus is capable of writing a preamble data sequence having a last 8 bits corresponding to a 2T transition pattern.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

The inventors have recognized that the constant frequency tones used in the preamble field of the known DDS-4 format devices have a different spectral power content to the user data in the data field. This is because the known preamble frequency tone comprises a sequence of bits +,+,−,−,+,+,−,− and so on in the preamble region. Such a sequence has a fairly narrow power spectrum centered around a narrow frequency band.

However, in general the user data in the data field has a power spectrum corresponding to a substantially random bit sequence, whereas the known constant frequency tone used in the preamble field of the DDS-4 format, has a different spectral power characteristic. Within the user data field, the user data is coded, such that it may appear random-like in nature. The minimum transition spacing physically recorded onto tape is of the order of 1T, and data exists in the user data area with spacings between transitions typically of 1T, 2T, 3T, 4T exclusively.

In the read channel of a prior art DDS-4 device, the automatic gain control system has an effective frequency response which causes it to respond differently to the received channel amplitude of a constant tone, as compared to the received channel amplitude of a pseudo random sequence of bits as present in the user data field, even though the actual amplitude of bits in those fields may be the same. This causes the automatic gain control system to adjust the gain of the received channel, when in fact no effective change in received amplitude of individual bits has occurred. The adjustment may be of the order 0.8 to 1.2 dB, with DDS-1 to DDS-3 gain control systems, and in a DDS-4 system, in which a sample derived gain control system is used, the adjustment may be of order of 0.5 dB. Thus, the prior art DDS-4 read channel may not have an optimal gain for receiving bits of user data, for a period at the start of reading each user data field. The prior art gain control systems attempt to make a change in channel gain when experiencing a transition from the prior art preamble data to the prior art user data when in fact the amplitudes of the bits of those data remains constant.

Changes in gain cause problems in the read channel at the sequence detector, which is usually a Viterbi detector. There are threshold levels in the detector, set at +2, 0 or −2, which determine whether the sampled signals read from the tape are in one of three bands, designated +2, 0, −2. If the amplitude of the signal into the sequence detector is changed, then this changes the level of the signal relative to the threshold levels, which increases the rate at which errors are introduced into reading the levels of the bits.

According to specific implementations of the present invention, the preamble region 702 which is used to acquire gain and timing information by a read channel, is modified to contain a data sequence having the property that it is treated by an automatic gain control system of the read channel, as nearly as possible in the same way in which the automatic gain control system would treat a block of encoded user data in a user data field. Thus, on the transition from the preamble field to the user data field, the automatic gain control system maintains a stable pulse amplitude of bits entering the sequence detector. To achieve this, a byte sequence having power spectrum properties similar to a block of encoded user data is used. Over a large amount of user data, the user data on average will have a power spectrum equivalent to that of random data. However, the preamble data cannot be truly random, since it contains information enabling a synchronizer to lock onto it. The preamble data sequence must also have properties which allow a synchronization detector to synchronize quickly within a few T cycles to the preamble sequence. Several byte sequences may be suitable for such a preamble data sequence, however in the best mode herein the inventors have found that a byte sequence as illustrated in FIG. 8 herein has optimum properties.

Figure 8:
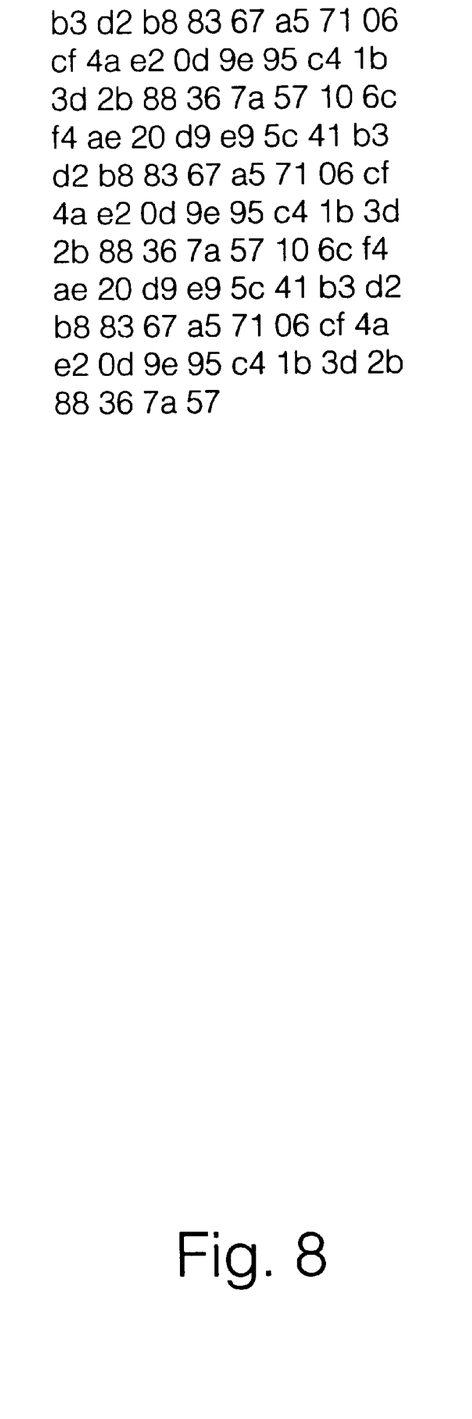
FIG. 8 herein illustrates schematically a specific example of a byte sequence applied in a preamble region of a logical write track according to a specific implementation of the present invention.
Figure 9:
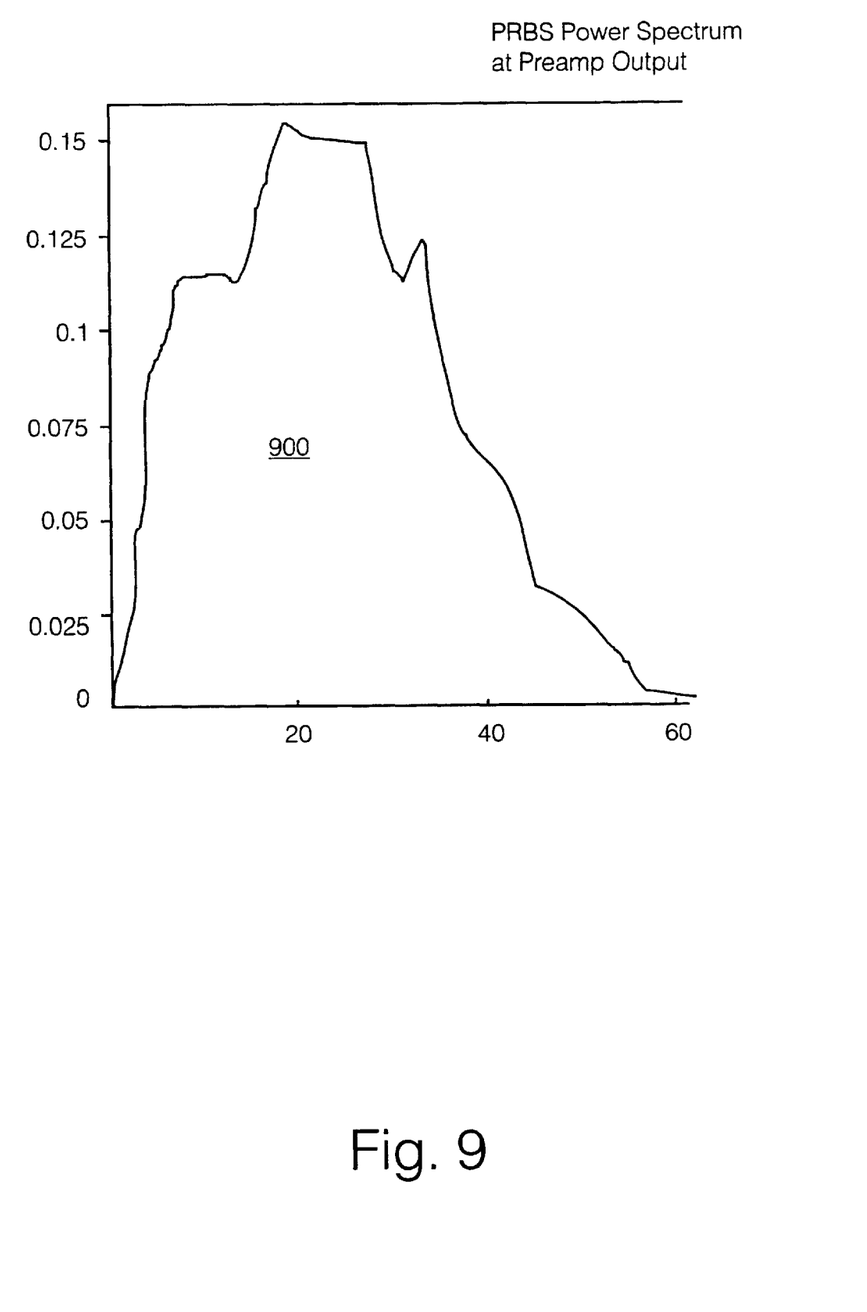
FIG. 9 illustrates schematically a power spectrum of a preamble signal having a byte sequence as illustrated in FIG. 8 herein, the power spectrum taken at a preamplifier output stage of the read channel.

Referring to FIG. 8 herein, there is illustrated schematically a byte sequence used in a preamble field of a logical data track according to a specific implementation of the present invention. The byte sequence illustrated in FIG. 8 is selected such as to have a power spectrum which matches closely a power spectrum of an average, or typical, sequence of user data bytes in the user data region 703. The byte sequence passes through an 8-10 encoder prior to writing to tape. In the best mode, the preamble sequence of FIG. 8 can be applied at bit wave lengths as recorded on tape data storage medium having a T length of 125 nm, giving a total preamble region of 854 bits over a distance of 107 μm. This has a same physical length across the tape as the prior art DDS-4 640 bit preamble sequence. This length is dictated by the physical properties of contact of a read or write head with the tape. The read or write heads are only linearly in physical contact with the tape for a finite distance either side of a center line 607 of the tape. It will be appreciated that the wavelength of bits may be varied without departing from the scope of the invention, and bit lengths in the range 100 nm to 140 nm may be suitable. The particular byte sequence illustrated in FIG. 8 is selected as a best mode byte sequence for reasons including the following:

Firstly, using the byte sequence as a preamble sequence, the spectrum of a received preamble signal at the preamplifier output of the read channel has no significant spectral holes in it. That is to say, there are no significant frequencies within the power spectrum of the output of the preamplifier, when reading the byte sequence of FIG. 8, which are absent or low. Referring to FIG. 9 herein, there is illustrated a power spectrum 900 of a signal produced at the output of preamplifier 502 in the read channel when reading a preamble field 702 containing a byte sequence as illustrated in FIG. 8 herein. In the power spectrum of FIG. 9, the distribution of power is centered around a mean value, and rolls off either side of the mean value without any significant troughs in power, over a range of frequencies between −6 dB points either side of a peak value. The automatic gain control circuit reacts differently to the spectrum of a 2T constant tone than it does to the spectrum of random data. The presence of intersymbol interference in random data tends to make the average magnitude of a received +2 or −2 signal slightly smaller than it should be, by up to 1 dB. This causes a small gain adjustment to be made by the automatic gain control circuit on reception of the first data fragment, even though there is no change in the amplitude of the bits of the incoming signal.

In prior art DDS-4 products, since the behavior of the automatic gain control circuit is known after detection of a 2T preamble, the prior art preamble detector in conjunction with a prior art data recovery state machine is programmed such that as the break between preamble and random data in a user field is detected, a target level of the automatic gain control circuit system is immediately changed by a programmable amount in anticipation of a perceived change in incoming amplitude of user data. However as the number of bits of data in a single track are increased, due to increasing the bit density for the purpose of increasing the overall data storage capacity of a cassette tape, the prior art data recovery state machine is no longer capable of reliably spotting the boundary between the preamble data and the (random) user data. A chip containing the data recovery state machine must be operated in a non-optimal mode and is therefore susceptible to changes in perceived incoming signal amplitude. The result is that the inherent mismatch between the power spectrum of the prior art 2T preamble data field and the (random-like) user data field becomes more of a problem as data storage densities increase, and can prevent detection of the start of the user data field after detection of the preamble data.

In the write channel, the user data is encoded using an 8-10 modulation encoder. The coding used in the 8-10 modulation has its own power spectrum characteristics. Over a large amount of user data, the user data is of a random-like nature and has a power spectrum characteristic corresponding substantially to a random bit sequence. The code used in the preamble region in the best mode is selected so as near as possible to have a power spectrum which is substantially the same as a power spectrum of an 8-10 modulation code power spectrum convolved with a power spectrum of a truly random bit sequence.

Figure 10:
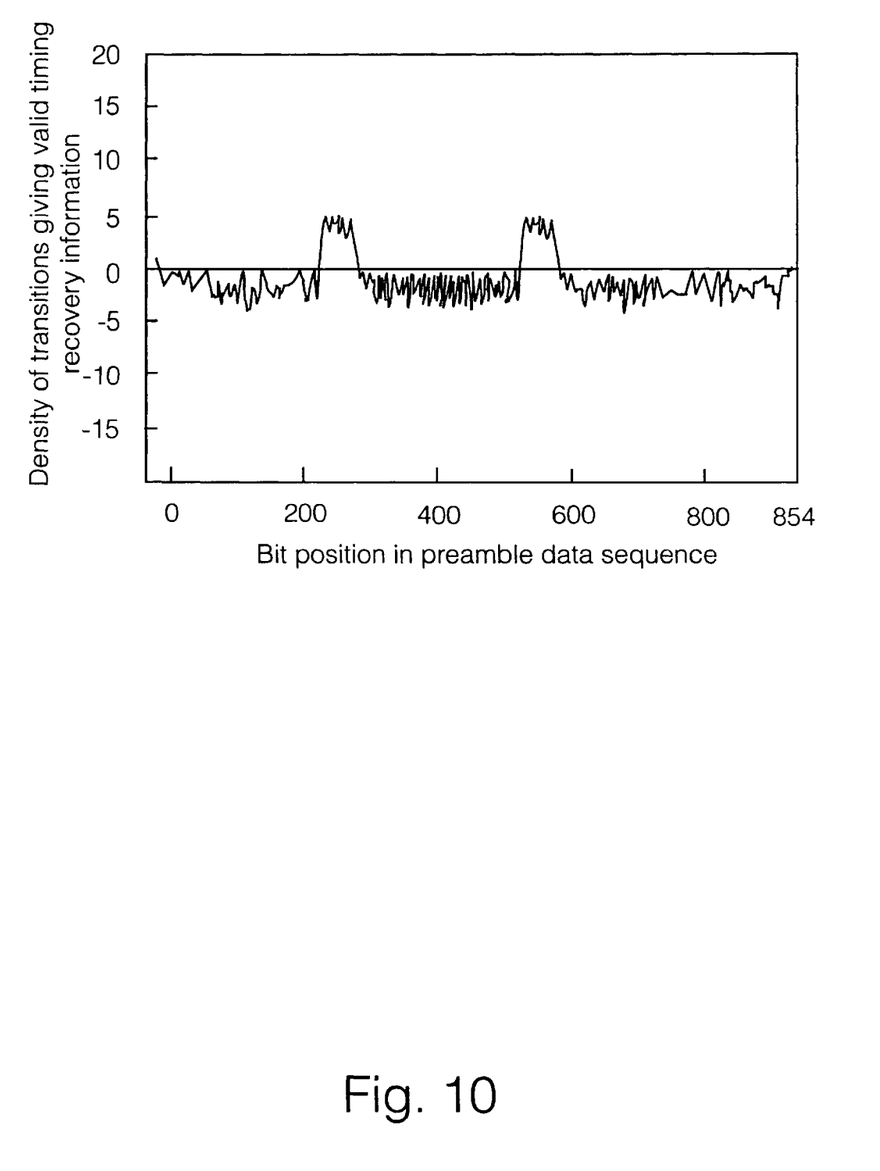
FIG. 10 illustrates schematically a distribution of transitions which give valid phase information in the byte sequence as illustrated in FIG. 8 herein.

Secondly, an even distribution of valid phase information is produced in the byte sequence of FIG. 8. It is important to have a sufficient number of valid transitions to allow a phase detector to maintain lock, or acquire lock under conditions of maximum noise. The preamble data sequence gives a number of transitions, which may be used for timing recovery. Only some of those transitions are useable by a timing circuit to acquire or maintain lock. Not all valid bit transitions contain phase information usable by a timing recovery loop circuit. Optimally, valid transitions would occur throughout the preamble region, so that lock could be acquired and/or maintained anywhere in the preamble data sequence. However, some prior art preamble byte patterns have their valid phase information concentrated at either the beginning or the end of the pattern, although most prior art preamble byte patterns contain about the same amount of usable phase information overall. The best mode byte sequence as illustrated in FIG. 8 herein has a relatively even distribution of valid phase information throughout the whole of the byte sequence. FIG. 10 illustrates a rolling deviation of a summed number of valid transitions from a summed average number of valid transitions per bit plotted against bit position within the preamble byte sequence in the preamble data region 702. An ideal byte sequence would have an even distribution of transitions containing valid phase information, distributed between the first and last bytes of the preamble data sequence. Each end of the graph is therefore constrained to be '0'. The byte sequence of FIG. 8 gives rise to the transition distribution diagram of FIG. 10 showing a relatively constant distribution of transitions having valid phase information, which are relatively evenly distributed from bytes 0 to 853 of the preamble byte sequence, with only small peaks of density of transitions having valid phase information, constrained within + or −6 transitions either side of a center value. In contrast, in prior art preamble byte sequence patterns, some patterns have a peak deviation from a mean exceeding + or −20 transitions either side of the peak.

Thirdly, in the present best mode specific implementation, the preamble byte sequence is selected to have its last 8 bits corresponding to a 2T pattern. That is to say a pattern of 1,0,1,0,1,0,1,0,1,0. This gives a write current of 1,1,−1,−1,1,1,−1,−1,1,1. This is otherwise known as 2T. This may give a lowest possible intersymbol interference noise on entry into a first synchronization sequence 704 at the start of the user data region 703, and therefore an enhanced probability of recovering the first synchronization sequence 704 in the user data region.

Figure 11:
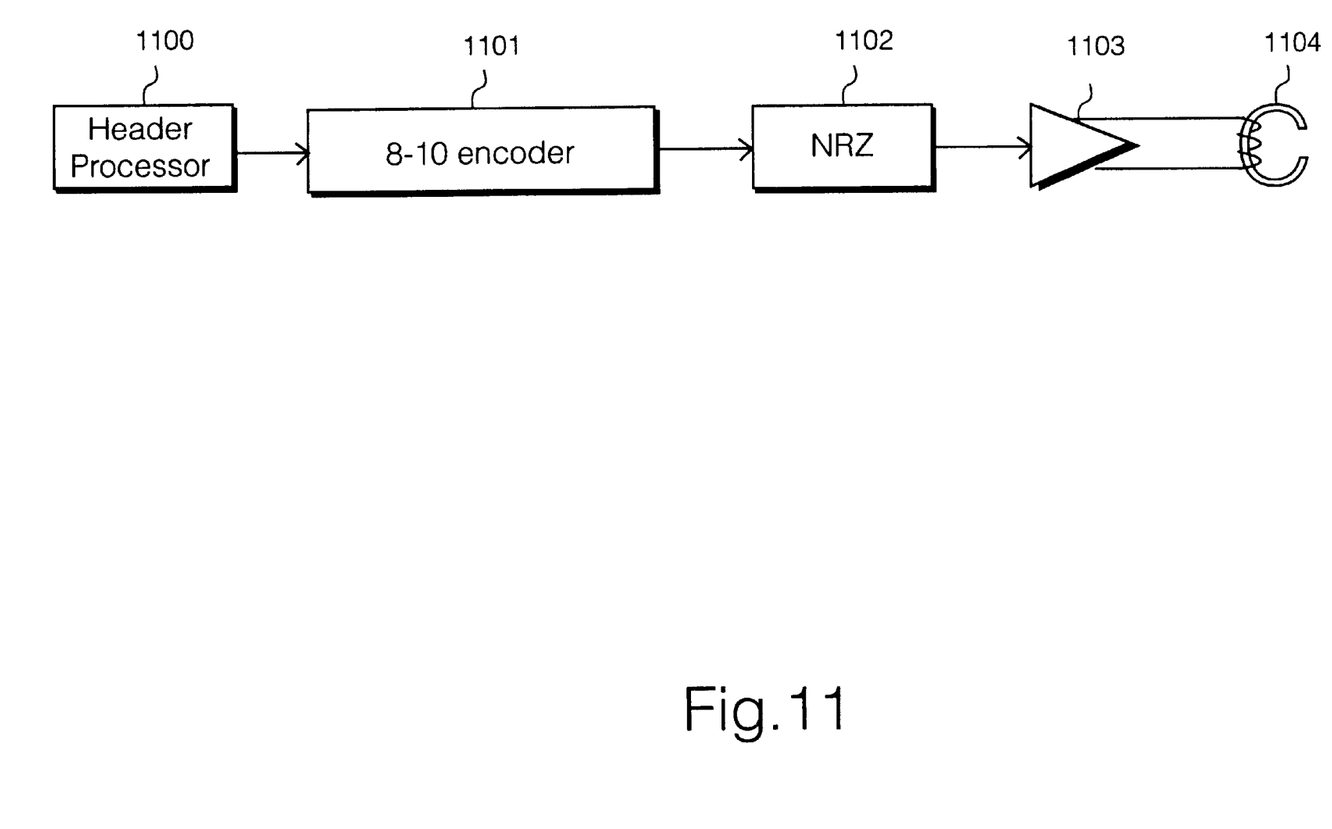
FIG. 11 illustrates schematically a write signal channel for writing data to a magnetic tape according to the specific implementation of the present invention.

Referring to FIG. 11 herein, there is illustrated schematically elements of a write channel for writing data to a magnetic tape data storage medium, according to a specific embodiment of the present invention. The write channel comprises a header processor 1100, for producing header data, including a preamble region, to prepend a user data region; an 8-10 encoder 1101 for encoding header data, including the preamble data and for encoding the user data, prior to recording onto tape; a non-return to 0 circuit 1102; an output amplifier 1103 for outputting a signal to a write head 1104, which writes data to a magnetic tape data storage medium as a plurality of pulses, striped in a direction across a magnetic tape as in the prior art DDS-4 format. The header processor 1100 comprises a preamble field generator for generating a preamble data according to the byte sequence illustrated with reference to FIG. 8 herein. The preamble generator may be implemented as a shift register arrangement, in an application specific integrated circuit (ASIC), or may be implemented as a processor driven by software.

Figure 12:
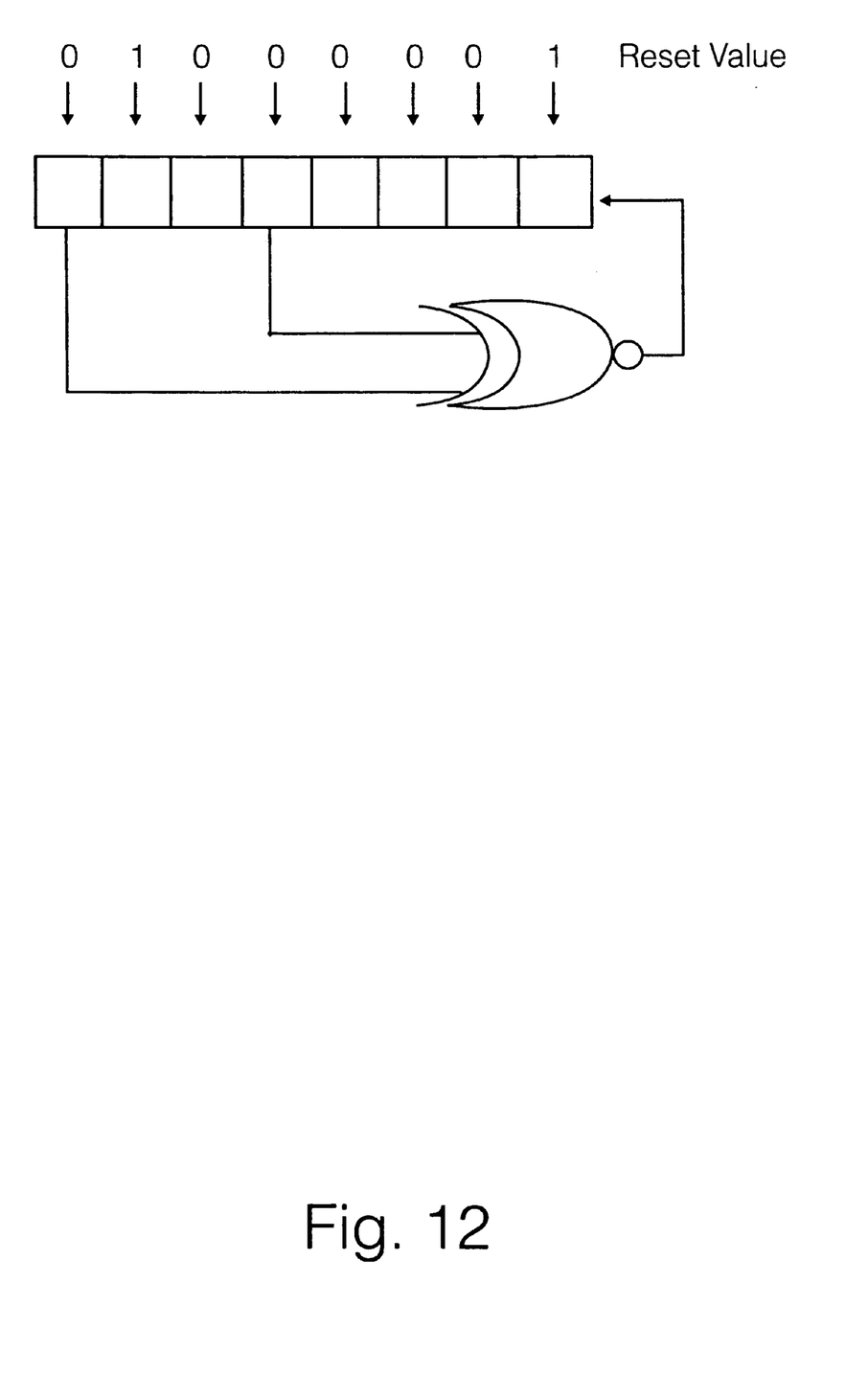
FIG. 12 illustrates schematically a shift register arrangement according to a specific embodiment of the present invention, for generating a byte sequence as illustrated is FIG. 8 herein.

Referring to FIG. 12 herein, there is illustrated schematically one implementation of a linear feedback shift register circuit capable of generating a pseudo random bit sequence as illustrated with reference to FIG. 8 herein. The shift register comprises an 8 bit register having an exclusive NOR gate (X-NOR) taking the output from locations 7 and 4 of the 8 bit register and feeding it back into a location 0 of the register. The first output from the linear feedback shift register is taken after 8 clock cycles, and should be the hex B3(h) byte. Successive outputs are taken after successive sets of 8 clock cycles. The shift register is reset to the value shown at the start of every track.

What is claimed is:

1. A method of encoding a plurality of tracks of data for storage on a tape data storage medium, said method comprising:

seguentially writing the plurality of data tracks to said tape data storage medium so each of said tracks includes a preamble region and a user data region, said preamble region having a preamble data sequence having a power spectrum substantially similar to a power spectrum of substantially random data in the user data region.

2. The method as claimed in claim 1, wherein said preamble region comprises between 800 and 900 bits.

3. The method as claimed in claim 1, wherein said preamble data sequence comprises bits, which when written to tape each occupy a length of the order of 100 to 140 nanometers per bit.

4. The method as claimed in claim 1, wherein said preamble data sequence has a distribution of density of transitions having valid phase information which is free of peaks of more than + or − 6 transitions.

5. The method as claimed in claim 1, wherein said plurality of data tracks are written across a width of said tape data storage medium in a direction transverse to a main length of said tape data storage medium.

6. The method as claimed in claim 1, wherein said preamble data sequence is 8-10 coded and a resulting coded preamble data has a power spectrum substantially similar to a power spectrum of an 8-10 modulation coding convolved with a power spectrum of a substantially random data.

7. The method as claimed in claim 1, wherein said preamble data sequence has at least 8 bits corresponding to a 2T transition pattern, where a 1T transition comprises a minimum spacing between pulse transitions.

8. In combination, an encoder device for encoding a plurality of tracks of data for storage on a tape data storage medium, and a write device for storing the plural encoded tracks on the tape data storage medium, said encoder device comprising means for generating a byte stream as claimed in claim 1.

9. A method of encoding a plurality of tracks of data for storage on a tape data storage medium, said method comprising:

for each of said plurality of data tracks written to said tape data storage medium, writing within said data track, a preamble region which precedes a user data region, said preamble region having a preamble data sequence having a power spectrum substantially similar to a power spectrum of a substantially random data, said preamble data sequence having a power spectrum having no significant troughs over a frequency band extending between first and second −6 dB power levels, each side of a peak value.

10. A method of encoding a plurality of tracks of data for storage on a tape data storage medium, said method comprising:

for each of said plurality of data tracks written to said tape data storage medium, writing within said data track, a preamble region which precedes a user data region, said preamble region having a preamble data sequence having a power spectrum substantially similar to a power spectrum of a substantially random data, said preamble data sequence having a power spectrum characteristic substantially similar to a power spectrum characteristic of the following byte stream of hexidecimal coded numbers:

b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57.

11. A method of encoding a plurality of tracks of data for storage on a tape data storage medium, said method comprising:

for each of said plurality of data tracks written to a tape data storage medium, writing within said data track a preamble region having a preamble data sequence having a power spectrum substantially similar to a power spectrum of a 8-10 modulation coding convolved with a power spectrum of a substantially random data.

12. A method of reading a data stream from a tape data storage medium, said method comprising the steps of:

reading preamble data, said preamble data comprising a data stream having a power spectrum equivalent to a power spectrum of an 8-10 modulation encoded byte stream convolved with a power spectrum of a substantially random bit stream; and synchronising to said read preamble data stream.

13. An apparatus f or encoding a plurality of tracks of data for storage on a tape data storage medium, said apparatus comprising:

a write circuit for sequentially writing said plurality of data tracks to a tape data storage medium, said write circuit arranged for sequentially writing on each of said data tracks, a preamble region which precedes a user data region, said preamble region having a preamble data sequence having a power spectrum substantially similar to a power spectrum of substantially random data in the user data region.

14. The apparatus as claimed in claim 13, wherein said write circuit is arranged to write between 800 and 900 bits of said preamble data sequence on each of said plurality of tracks.

15. The apparatus as claimed in claim 13, wherein said write circuit is arranged to write bits of data to said tape, wherein each said bit occupies a length of the order 100 to 140 nanometers per bit.

16. The apparatus as claimed in claim 13, arranged to write said preamble data sequence having a distribution of transitions containing phase information validly useable by a timer circuit which is free of peaks of density of more than + or −6 transitions from a mean value.

17. The apparatus as claimed in claim 13, arranged to write said plurality of data tracks across a width of said tape data storage medium in a direction transverse to a main length of said tape data storage medium.

18. The apparatus as claimed in claim 13, comprising an 8-10 encoder for encoding said preamble data sequence, to result in an 8-10 encoded preamble data sequence having a power spectrum substantially similar to a power spectrum of an 8-10 coding convolved with a power spectrum of a substantially random data.

19. An apparatus for encoding a plurality of tracks of data for storage on a tape data storage medium, said apparatus comprising:

a write circuit for writing said plurality of data tracks to a tape data storage medium, said write circuit arranged for writing on said data track, a preamble region which precedes a user data region, said preamble region having a preamble data sequence having a power spectrum substantially similar to a power spectrum of a substantially random data, said write circuit being arranged to write a preamble data sequence having a power spectrum characteristic substantially similar to a power spectrum characteristic of the following byte stream of hexidecimal coded numbers:

b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57.

20. An apparatus for reading a data stream from a tape data storage medium, said apparatus comprising:

a transducer for reading said tape data storage medium; and means for sequendtially reading a preamble data sequence and user data, said preamble data sequence comprising a data stream having a power spectrum equivalent to a power spectrum of the user data.

21. An apparatus for reading and writing a data sequence in sequence, said data sequence comprising:

a preamble data region in sequence with a user data region;

wherein said preamble data region comprises a sequential byte stream having a power spectrum substantially similar to a power spectrum of said user data in said user data region.

22. An apparatus for reading and writing a data sequence, said data sequence comprising:

a preamble data region and;

a user data region;

wherein said preamble data region comprises a byte stream having a power spectrum substantially similar to a power spectrum of said user data in said user data region, said byte stream comprising a byte stream having a power spectrum characteristic substantially similar to a power spectrum characteristic of the following byte stream of hexidecimal coded numbers:

b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57.

23. An apparatus for reading and writing a data sequence, said data sequence comprising:

a preamble data region and;

a user data region;

wherein said preamble data region comprises a byte stream having a power spectrum substantially similar to a power spectrum of said user data in said user data region, and an 8-10 modulation coder for coding said preamble data and said user data, wherein said coded preamble data has a power spectrum substantially similar to a power spectrum of said user data convolved with a power spectrum of said modulation coding.

24. An apparatus for reading and writing a data sequence, said data sequence comprising:

a preamble data region and;

a user data region;

wherein said preamble data region comprises a byte stream having a power spectrum substantially similar to a power spectrum of said user data in said user data region, and having 8 last sequential bits corresponding to a 2T transition pattern.

25. An encoder device for encoding a plurality of tracks of data for storage on a tape data storage medium, said encoder device comprising a byte stream generator for encoding plural tracks for recording on a tape data storage medium so each of said recorded tracks includes a preamble region which precedes a user data region, said preamble region having a preamble data sequence having a power spectrum substantially similar to a power spectrum of substantially random data.

26. An apparatus for reading a data stream from a tape data storage medium, said apparatus comprising:

a head for sequentially reading a preamble data sequence and user data, said preamble data sequence comprising a data stream having a power spectrum equivalent to a power spectrum of the user data.

27. A magnetic tape including multiple diagonal tracks, each of the diagonal tracks including a preamble portion and a data portion, the preamble and data portions being such that when read the preamble and data portions have substantially similar power spectra.

28. The magnetic tape of claim 27 wherein said preamble portion, when read, has a power spectrum having no significant troughs over a frequency band extending between first and second −6 dB power levels, each side of a peak value.

29. The magnetic tape of claim 27 wherein said preamble portion, when read, has a power spectrum characteristic substantially similar to a power spectrum characteristic of the following byte stream of hexidecimal coded numbers:

b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57, 10, 6c, f4, ae, 20, d9, e9, 5c, 41, b3, d2, b8, 83, 67, a5, 71, 06, cf, 4a, e2, 0d, 9e, 95, c4, 1b, 3d, 2b, 88, 36, 7a, 57.

30. A magnetic tape including multiple diagonal tracks, each of the diagonal tracks including a preamble portion and a data portion, the preamble and data portions being such that when read and supplied to an AGC circuit via an amplifier and initial equalizer no substantial change in the gain of the AGC circuit is necessary to maintain a substantially constant amplitude output of the AGC circuit.

* * * * *